July 25, 1939.  N. L. ALISON  2,167,382
INTERRUPTED CORE RING COUPLING
Filed June 9, 1938  3 Sheets-Sheet 1
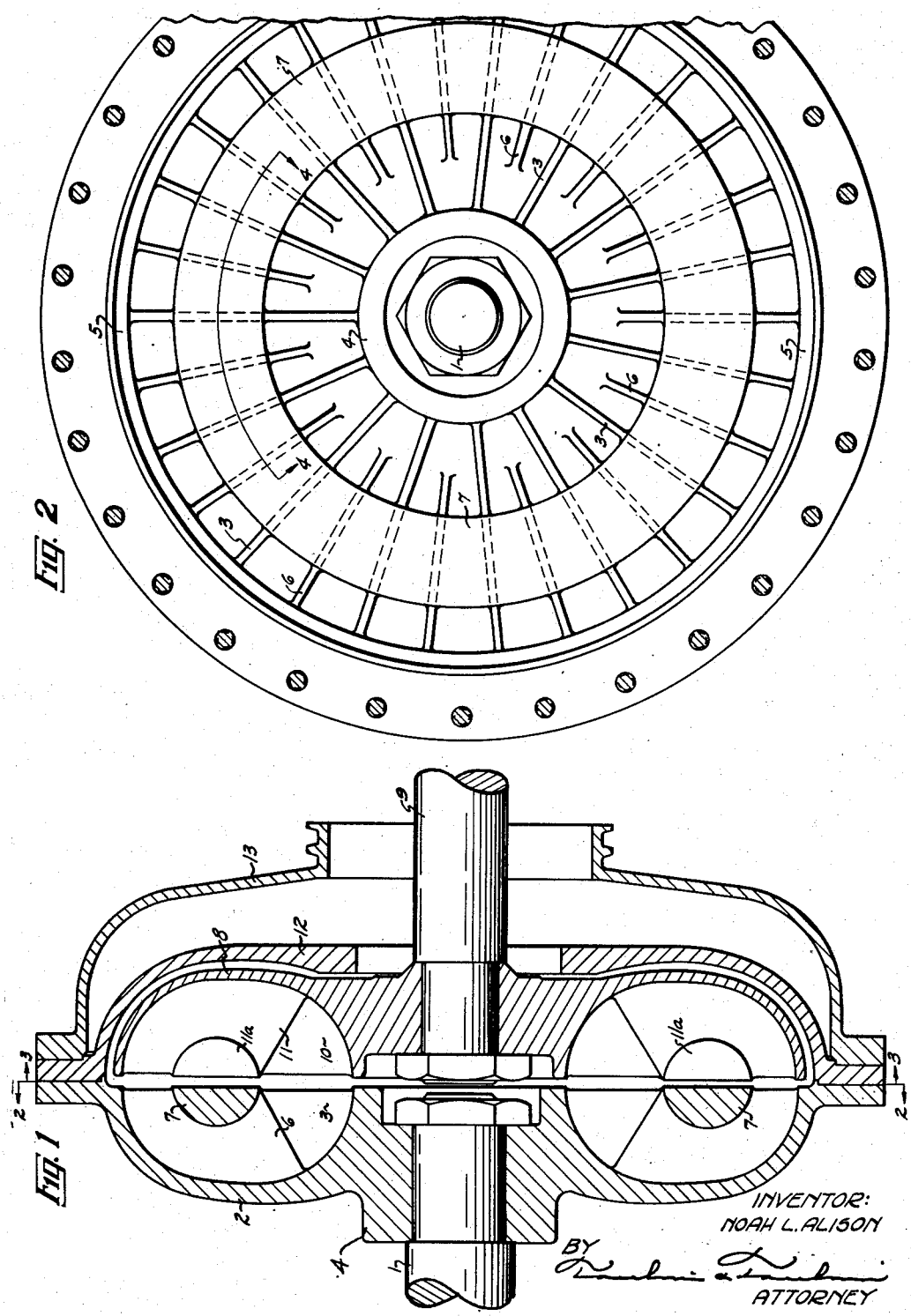
INVENTOR:
NOAH L. ALISON
BY
ATTORNEY Jul. 25, 1939.    N. L. ALISON    2,167,382
INTERRUPTED CORE RING COUPLING
Filed June 9, 1938    3 Sheets-Sheet 2

INVENTOR:
NOAH L. ALISON
BY
ATTORNEY.

July 25, 1939.  N. L. ALISON  2,167,382
INTERRUPTED CORE RING COUPLING
Filed June 9, 1938  3 Sheets-Sheet 3
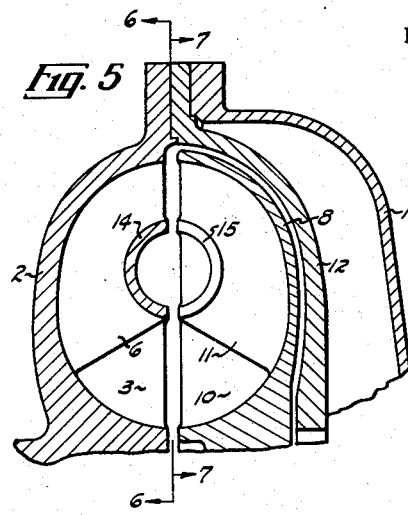
Fig. 5
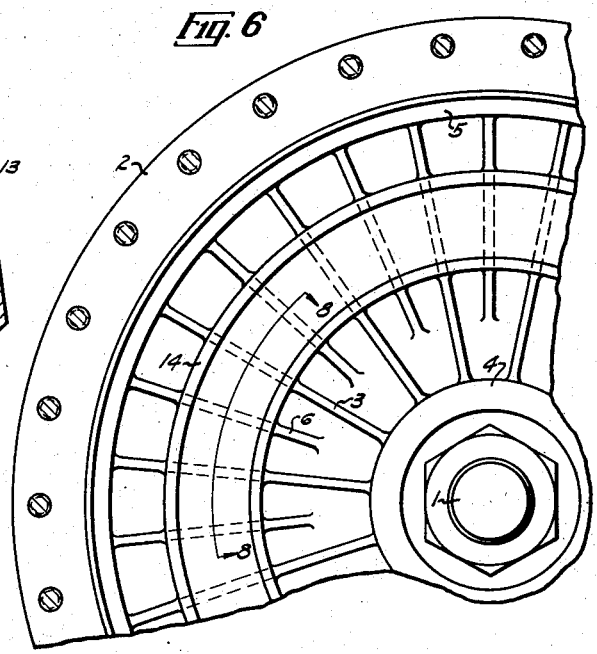
Fig. 6
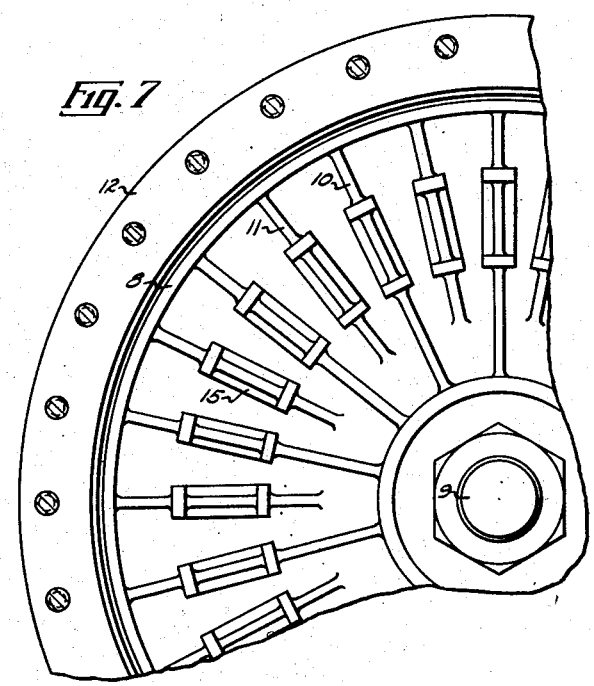
Fig. 7
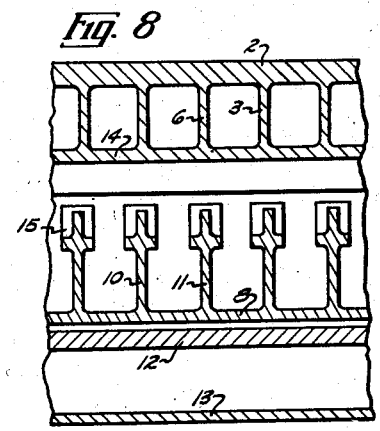
Fig. 8
INVENTOR:
NOAH L. ALISON
BY 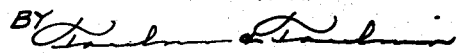
ATTORNEY.

Patented July 25, 1939

2,167,382

UNITED STATES PATENT OFFICE 2,167,382

INTERRUPTED CORE RING COUPLING

Noah L. Alison, Detroit, Mich., assignor to American Blower Corporation, Detroit, Mich., a corporation of Delaware Application June 9, 1938, Serial No. 212,759
In Great Britain October 28, 1936

6 Claims. (Cl. 60—54)

My invention relates to hydraulic couplings and, in particular, to variable speed hydraulic couplings.

It is the object of this invention to provide a coupling having an interrupted core ring on the runner and a continuous core ring on the impeller.

It is an object to provide a coupling suitable for use as a torque limiting device.

The present invention relates to hydraulic couplings of the kinetic type, comprising an impeller member having radial, or partly radial, vanes coaxial with juxtaposed vanes, these members together forming a toroidal circuit for the coupling fluid. A particular feature of this invention is the use of an interrupted core ring on the runner and a continuous core ring on the impeller.

It is the object of this invention to eliminate difficulties heretofore encountered with couplings of this type in which a "flat spot" occurs in the curve relating the liquid content of the coupling to slip after the load on the coupling is considerably lower than the normal full load rating. This flat spot makes it difficult to regulate the speed of the driven machine rapidly and accurately while the filling passes through this particular range.

It is the object of my invention to eliminate the undesirable characteristic known as the "flat spot", which means that the relation between speed and the amount of oil in the coupling is not a straight line on a graph indicating these relationships. This condition causes serious trouble in connection with the automatic control of hydraulic couplings. It is the object of this invention to eliminate such objectionable conditions so that the relationship between the speed and the amount of oil in the coupling will be suitably maintained.

This condition is brought about by the presence of the core ring in variable speed hydraulic couplings as heretofore built, the presence of the core ring apparently impeding the flow of the oil in the coupling where the coupling was partially filled, resulting in erratic and undesirable characteristics.

It is an object of my invention to provide a novel construction and method of operation depending thereon which permits of a substantially normal oil movement and a balanced oil movement irrespective of the quantity of oil remaining in the coupling.

These and other objects and advantages will appear from the following description taken in connection with the drawings.

In the drawings:

Figure 1 is a vertical section through the coupling, showing a continuous core ring on the impeller and an interrupted core ring on the runner;

Figure 2 is an inside elevation of the impeller, taken on the line 2—2 of Figure 1;

Figure 5 is a section similar to that of Figure 1, showing a modified form of core ring;

Figure 6 is a partial inside view of the impeller of Figure 5, taken on the line 6—6 of Figure 5;

Figure 7 is a partial inside view of the runner of the type shown in Figure 5, taken on the line 7—7 of Figure 5; and Figure 8 is a section on the line 8—8 of Figure 6, looking in the direction of the arrows.

Figure 3:
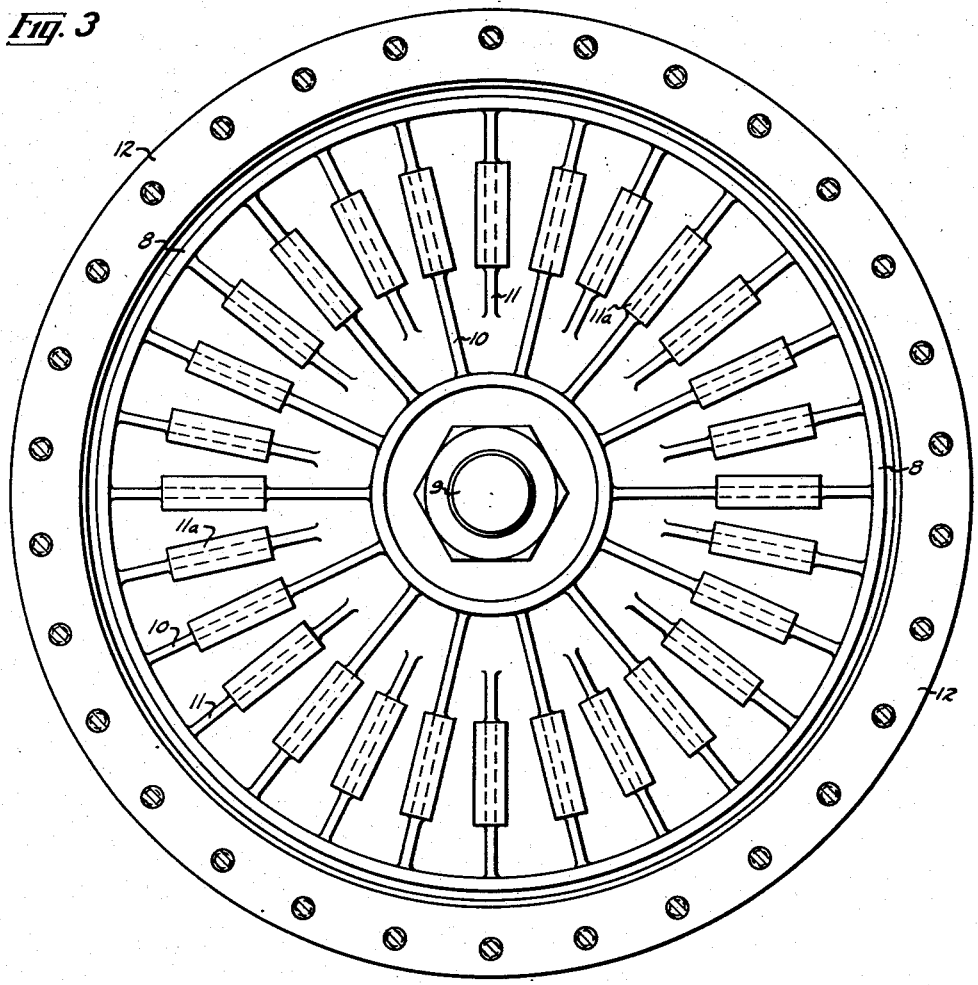
Figure 3 is an inside elevation of the runner, taken on the line 3—3 of Figure 1.
Figure 4:
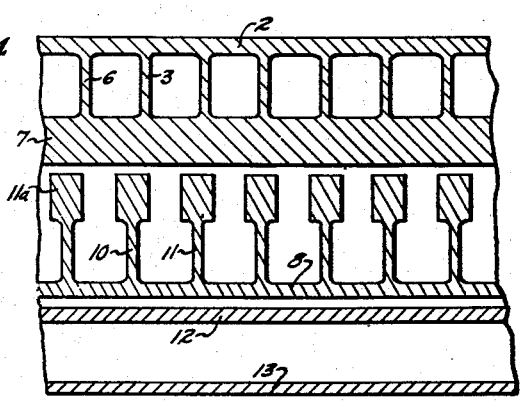
Figure 4 is a section on the line 4—4 of Figure 2.

It is usual to provide prior art couplings with core guide members in the form of two dished rings, mounted respectively on the impeller and the runner vanes, and juxtaposed to form a ring of substantially circular section. Thus the well-known "Vulcan" coupling is provided with core guide rings and the vanes are continued within the core space. In the "Vulcan-Sinclair" coupling, on the other hand, the core space is usually not vaned, and in the case of the scoop-tube type of coupling the two dished core guide rings are usually fitted with flat core-filling plates which seal the interior of the core from the circuit, or the core guide rings are of solid instead of hollow construction.

Such hydraulic couplings have certain objections. For example, where a "Vulcan" or a "Vulcan-Sinclair" coupling, having means whereby the liquid content can be varied during operation, is employed to couple a constant-speed driving motor to a variable-speed load, particularly a load, such as a fan, the torque of which varies as the square of the speed, a flat spot occurs in the curve relating liquid content of the coupling to slip, the slip remaining substantially constant over an appreciable range of filling. This flat spot makes it difficult to regulate the speed of the driven machine rapidly and accurately while the degree of filling passes through this particular range, and difficulties may be encountered when automatic control apparatus is used.

This flat spot effect is also apparent in the torque-slip characteristic curves of such couplings at constant impeller speed when the circuits are partly filled with a constant quantity of liquid, and this renders the couplings in certain applications less convenient for driving a varying load than a coupling having a substantially linear torque-slip characteristic would be.

Another known form of hydraulic coupling having a toroidal working circuit is not provided with core guide members; and although this form has no serious flat spot in its characteristic curve, it suffers from "surging", that is to say, fairly rapid and very large variations in its torque transmission capacity over a critical range of filling when the slip is high. Furthermore, this last form of coupling has a higher slip, other things being equal, than a "Vulcan" and a "Vulcan-Sinclair" coupling, and in consequence its efficiency is lower.

Another object of my invention is to provide an improved form of hydraulic coupling in which the objections hereinbefore referred to are reduced or overcome.

According to my invention, a hydraulic coupling of the type set forth comprises an interrupted core ring on the runner and a continuous core ring on the impeller to secure the results desired.

By "interrupted core ring" is meant a core ring composed of a multiplicity of circumferentially spaced segments, the intervening spaces of which provide passageways for the flow of the working liquid, as distinguished from an uninterrupted core ring in which no such spaces are provided between the core segments for the flow of the working liquid from the working circuit into the core space.

Referring to the drawings in detail, 1 is a drive shaft on which is mounted an impeller 2 having a plurality of radial vanes 3 extending from the hub 4 to the periphery 5. Between these vanes 3 are shorter vanes 6 extending from a point remote from the hub 4 to the periphery 5. Mounted upon these vanes is an annular core ring 7 which is semi-circular in section.

Oppositely disposed to the impeller 2 is the runner 8 mounted upon the driven shaft 9. This runner is provided with a plurality of vanes 10 and 11. Each of these vanes is provided, preferably, with a severed section 11a of a core ring. Such sections are semi-circular in cross section. The impeller 2 carries the overlapping members 12 and 13.

Referring to Figures 5 to 8: In these views, the core ring, instead of being solid as the core ring 7 of Figure 1, is hollow and semi-circular. It is designated 14. Likewise, the severed portions of the core ring on the runner 8 are hollow and semi-circular in section, as at 15. In Figures 5 to 8 the parts similar to the structure shown in Figure 1 are given the same reference numerals as in Figure 1.

In previous constructions where the core ring was continuous on both the impeller and the runner, I have found that it was not possible for the oil to circulate through the core guide ring when the coupling was only partially filled. This resulted in difficulties that I have experienced with couplings of this type. By the present arrangement, the oil is permitted to pass through from one half of the coupling to another when partially filled, that is, it can pass in the runner between the portions 11 through the spaces 16.

In all the constructions shown in the several views, the principle is the same of permitting the movement of the oil between the severed portions of the core ring on the runner and between the vanes so as to produce the result desired. This free passage between the sections of the core ring provides for a substantially symmetrical rotation of the oil body. This symmetrical form remains substantially uniform irrespective of the quantity of oil within the coupling, thereby giving the desired relationship between speed and oil volume in the coupling.

This application is a continuation of the basic disclosure in my copending application Serial No. 139,766, filed April 29, 1937, now United States Patent No. 2,139,107, granted December 6, 1938, and is a continuation in part thereof. It shows specifically the improvement which is the subject-matter of this application that is specifically directed to a certain type of conditions of operation as set forth herein.

It will be understood that I desire to comprehend within my invention such modifications as come within the scope of the claims and the invention.

Having thus fully described my invention, what I claim as new and desire to secure by Letters Patent is:

1. In combination, in a hydraulic coupling, of an impeller, a driving shaft therefor, a runner, a driven shaft therefor, a continuous core ring mounted within and upon said impeller, and an interrupted core ring mounted on said runner, said interrupted core ring including a multiplicity of circumferentially spaced segments, the spaces between said segments providing passageways for the flow of the working liquid.

2. In combination, in a hydraulic coupling, of an impeller, a driving shaft therefor, a runner, a driven shaft therefor, a continuous core ring mounted within and upon said impeller, an interrupted core ring mounted on said runner, and a plurality of radially disposed vanes mounted in said impeller and in said runner adapted to respectively support said continuous core ring and said interrupted core ring, said interrupted core ring including a multiplicity of circumferentially spaced segments, the spaces between said segments providing passageways for the flow of the working liquid.

3. In combination, in a hydraulic coupling, of a driving shaft and an impeller, a plurality of radially disposed vanes therein of different lengths alternately disposed, a runner having a plurality of similar vanes, a driven shaft connected thereto, a continuous core ring mounted on said vanes on said impeller, and interrupted core ring sections mounted on said runner vanes, said interrupted core ring including a multiplicity of circumferentially spaced segments, the spaces between said segments providing passageways for the flow of the working liquid.

4. In combination, in a hydraulic coupling, of a driving shaft and an impeller, a plurality of radially disposed vanes therein of different lengths alternately disposed, a runner having a plurality of similar vanes, a driven shaft connected thereto, a continuous core ring mounted on said vanes on said impeller, and interrupted core ring sections mounted on said runner vanes, said sections being arranged in annular alignment in spaced relationship with respect to one another.

5. In combination, in a hydraulic coupling, of a drive shaft and an impeller having a plurality of radial vanes of unequal length with spaces therebetween, a runner having a plurality of similar vanes, a driven shaft connected thereto, a continuous core ring mounted on the outer face of the impeller vanes, said ring being semi-circular in cross section, and an interrupted core ring of similar cross section including a multiplicity of circumferentially spaced segments, said segments being mounted on each of the vanes of said runner with spaces formed therebetween for passage of oil.

6. In combination, in a hydraulic coupling, of a drive shaft and an impeller thereon, a driven shaft and a runner thereon, said impeller and runner each having a plurality of radially disposed vanes progressively spaced from one another outwardly, a continuous core ring which is semi-circular in section mounted on and between said vanes on said impeller; and an interrupted core ring on said runner comprising core ring segments of substantially equal thickness measured in a circumferential direction, said segments being individually mounted on each of said vanes in spaced relationship from one another.

NOAH L. ALISON.